(12) United States Patent
Chun et al.

(10) Patent No.: US 9,357,422 B2
(45) Date of Patent: May 31, 2016

(54) METHOD AND APPARATUS FOR REPORTING MEASUREMENT INFORMATION TO NETWORK AT USER EQUIPMENT IN A WIRELESS COMMUNICATION SYSTEM

(75) Inventors: Sungduck Chun, Gyeonggi-do (KR); Sunghoon Jung, Gyeonggi-do (KR); Seungjune Yi, Gyeonggi-do (KR); Youngdae Lee, Gyeonggi-do (KR); Sungjun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 14/343,889

(22) PCT Filed: Sep. 6, 2012

(86) PCT No.: PCT/KR2012/007170
§ 371 (c)(1),
(2), (4) Date: Mar. 10, 2014

(87) PCT Pub. No.: WO2013/042887
PCT Pub. Date: Mar. 28, 2013

(65) Prior Publication Data
US 2014/0219181 A1 Aug. 7, 2014

Related U.S. Application Data

(60) Provisional application No. 61/592,592, filed on Jan. 30, 2012, provisional application No. 61/556,786, filed on Nov. 7, 2011, provisional application No. 61/555,488, filed on Nov. 4, 2011, provisional application No. 61/541,102, filed on Sep. 30, 2011, provisional application No. 61/537,545, filed on Sep. 21, 2011.

(51) Int. Cl.
*H04W 4/00* (2009.01)
*H04W 24/10* (2009.01)

(52) U.S. Cl.
CPC .................................... *H04W 24/10* (2013.01)

(58) Field of Classification Search
USPC ......... 370/328, 329, 349, 335, 320, 342, 331, 370/412, 332, 334, 338; 455/450, 422, 1
See application file for complete search history.

(56) References Cited

U.S. PATENT DOCUMENTS

2005/0201354 A1\* 9/2005 Hosaka ................. H04L 1/1887
370/349
2011/0237269 A1\* 9/2011 Chen ................. H04W 36/0088
455/450

FOREIGN PATENT DOCUMENTS

WO 2011/093653 A2 8/2011
WO 2011/093665 A2 8/2011

OTHER PUBLICATIONS

International Search Report and Written Opinion issued in corresponding International Patent Application No. PCT/KR2012/007170 dated Feb. 28, 2013.
3GPP TS 37.320 v10.2.0, 3GPP; TS GRAN; UTRA and E-UTRA; Radio measurement collection for Minimization of Drive Test (MDT); Overall description; Stage 2 (Release 10), Jun. 2011.
Huawei et al., "The MDT applicability of EPLMN," 3GPP TSG-RAN2 Meeting #75, R2-114011, Aug. 22-26, 2011.

\* cited by examiner

*Primary Examiner* — Chi H Pham
*Assistant Examiner* — Alexander O Boakye
(74) *Attorney, Agent, or Firm* — Morgan, Lewis & Bockius LLP

(57) ABSTRACT

A method for transmitting and receiving a signal to and from a network at a User Equipment (UE) in a wireless communication system is disclosed. The method includes receiving measurement configuration information from the network, storing data unit retransmission information related to a data unit based on the measurement configuration information, if a predetermined condition is satisfied, receiving a request message requesting a measurement result from the network, and transmitting the data unit retransmission information to the network in response to the request message.

16 Claims, 8 Drawing Sheets

(a) Control-plane protocol stack (b) User-plane protocol stack

METHOD AND APPARATUS FOR REPORTING MEASUREMENT INFORMATION TO NETWORK AT USER EQUIPMENT IN A WIRELESS COMMUNICATION SYSTEM

TECHNICAL FIELD

The present invention relates to a wireless communication system, and more particularly, to a method and apparatus for reporting measurement information to a network at a User Equipment (UE) in a wireless communication system.

BACKGROUND ART

A brief description will be given of a 3rd Generation Partnership Project (3GPP) Long Term Evolution (LTE) system as an example of a wireless communication system to which the present invention can be applied.

FIG. 1 illustrates the configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to "3rd Generation Partnership Project; Technical Specification Group Radio Access Network" Release 7 and Release 8, respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. The eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectations of users and service providers are on the increase. Considering other radio access technologies under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE OF INVENTION

Technical Problem

An object of the present invention devised to solve the problem lies on a method and apparatus for reporting measurement information to a network at a UE in a wireless communication system.

Solution to Problem

The object of the present invention can be achieved by providing a method for transmitting and receiving a signal to and from a network at a User Equipment (UE) in a wireless communication system, including receiving measurement configuration information from the network, storing data unit retransmission information related to a data unit based on the measurement configuration information, if a predetermined condition is satisfied, receiving a request message requesting a measurement result from the network, and transmitting the data unit retransmission information to the network in response to the request message.

The measurement configuration information may include at least one of a storing period of the data unit retransmission information, a valid duration of the measurement configuration information, and a maintenance time of the stored data unit retransmission information. The predetermined condition may be that scheduling information is not received from the network until expiration of a predetermined timer after transmitting a buffer status report message.

The data unit retransmission information may be the number of expirations of the predetermined timer during a storing period of the data unit retransmission information. The data unit retransmission information may include at least one of place information and time information about triggering of the buffer status report message.

When the number of expirations of the predetermined timer is equal to or larger than a threshold or when the number of data units for which the number of expirations of the predetermined timer is equal to or larger than a first threshold is equal to or larger than a second threshold, the data unit retransmission information may be stored. In this case, information about the threshold or information about the first and second thresholds may be included in the measurement configuration information.

The data unit may be related to a predetermined channel and information about the predetermined channel may be preliminarily received from the network.

Advantageous Effects of Invention

According to the embodiments of the present invention, a UE can effectively report a valid measurement result to a network.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system.

Figure 1:
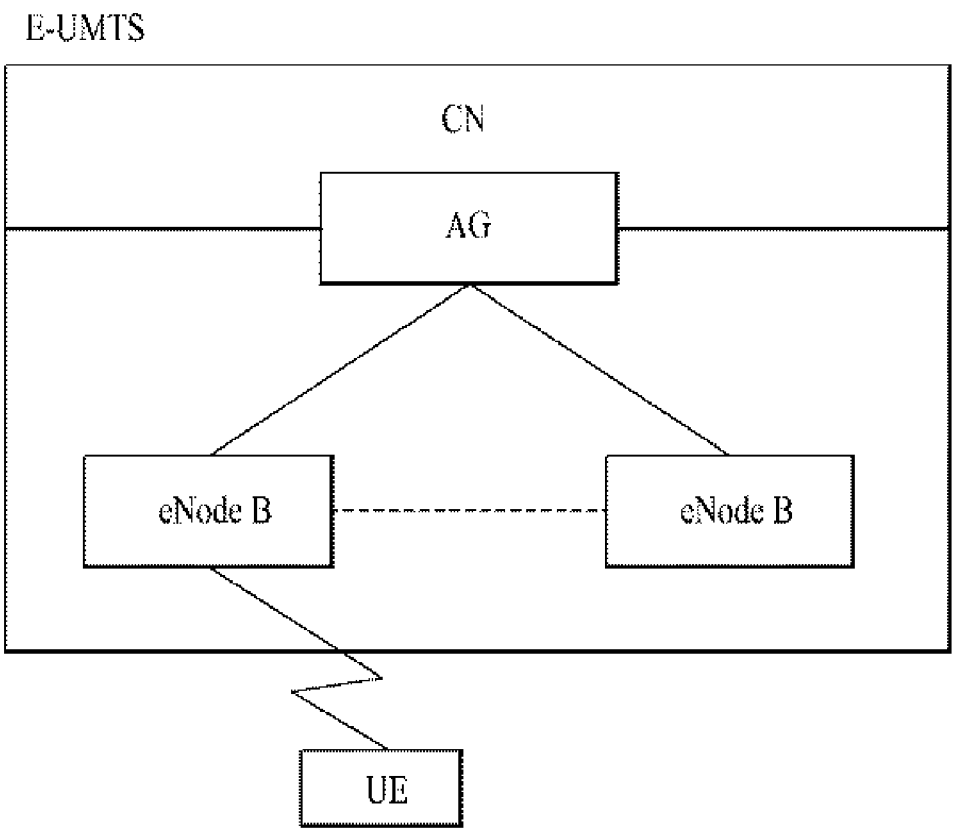
FIG. 1 illustrates the configuration of an Evolved Universal Mobile Telecommunications System (E-UMTS) network as an example of a wireless communication system.
Figure 2:
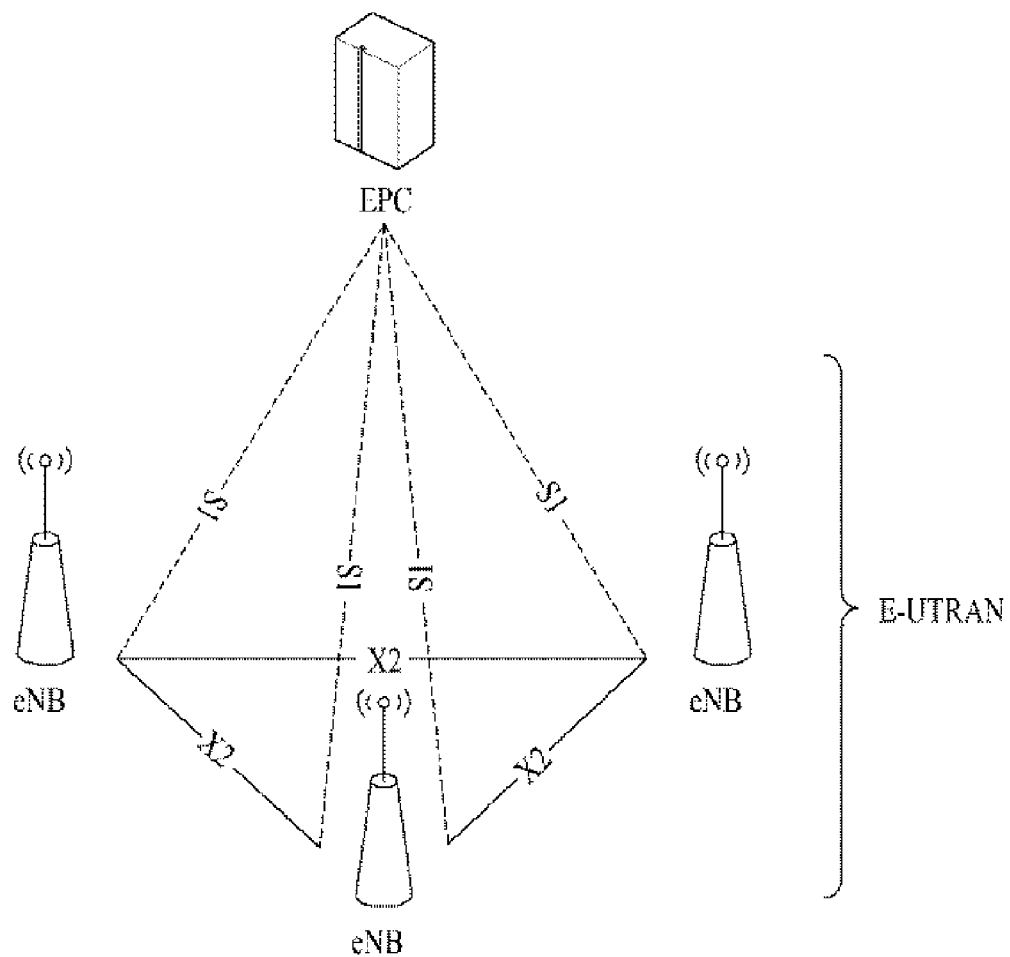
FIG. 2 conceptually illustrates the configuration of an Evolved Universal Terrestrial Radio Access Network (E-UTRAN)

FIG. 2 conceptually illustrates the configuration of an Evolved Universal Terrestrial Radio Access Network (E-UTRAN). E-UTRAN is an evolution of the legacy UTRAN system. The E-UTRAN includes evolved Node Bs (eNode Bs or eNBs) which are connected to each other via an X2 interface. A cell is connected to a User Equipment (UE) via a radio interface and to an Evolved Packet Core (EPC) via an S1 interface.

The EPC includes a Mobility Management Entity (MME), a Serving GateWay (S-GW), and a Packet Data Network-GateWay (PDN-GW). The MME has information about connections and capabilities of UEs, mainly for use in managing the mobility of the UEs. The S-GW is a gateway having the E-UTRAN as an end point, and the PDN-GW is a gateway having a PDN as an end point.

Figure 3:
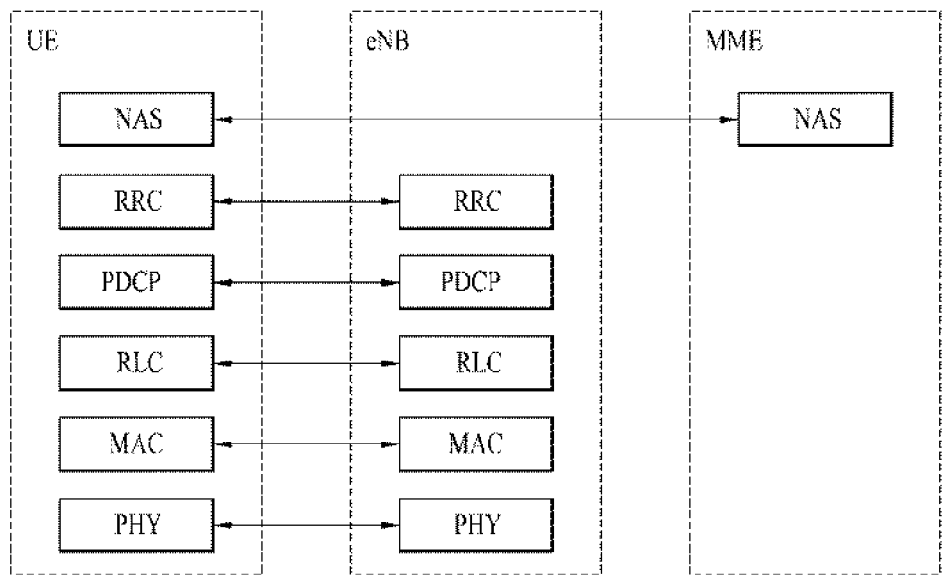
FIG. 3 illustrates a control-plane protocol stack and a user-plane protocol stack in a radio interface protocol architecture conforming to a 3rd Generation Partnership Project (3GPP) radio access network standard between a User Equipment (UE) and the E-UTRAN.
Figure 3:
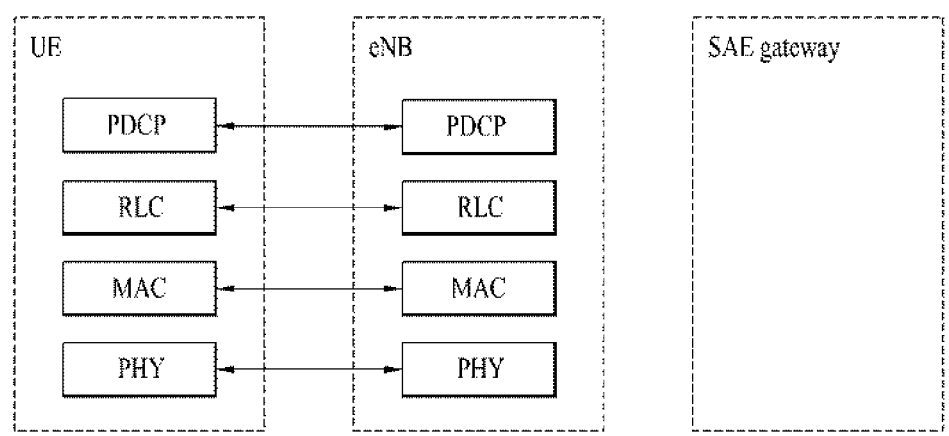

FIG. 3 illustrates control-plane and user-plane protocol stacks in a radio interface protocol architecture conforming to a 3GPP wireless access network standard between a UE and an E-UTRAN. The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, the Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other.

A cell covered by an eNB is set to one of the bandwidths of 1.25, 2.5, 5, 10, 15, and 20 MHz and provides downlink or uplink transmission service to a plurality of UEs in the bandwidth. Different cells may be set to different bandwidths.

Downlink transport channels used to deliver data from the E-UTRAN to UEs include a Broadcast CHannel (BCH) carrying system information, a Paging CHannel (PCH) carrying a paging message, and a Shared CHannel (SCH) carrying user traffic or a control message. Downlink multicast traffic or control messages or downlink broadcast traffic or control messages may be transmitted on a downlink SCH or a separately defined downlink Multicast CHannel (MCH).

Uplink transport channels used to deliver data from a UE to the E-UTRAN include a Random Access CHannel (RACH) carrying an initial control message and an uplink SCH carrying user traffic or a control message. Logical channels that are defined above transport channels and mapped to the transport channels include a Broadcast Control CHannel (BCCH), a Paging Control CHannel (PCCH), a Common Control CHannel (CCCH), a Multicast Control CHannel (MCCH), and a Multicast Traffic CHannel (MTCH).

Figure 4:
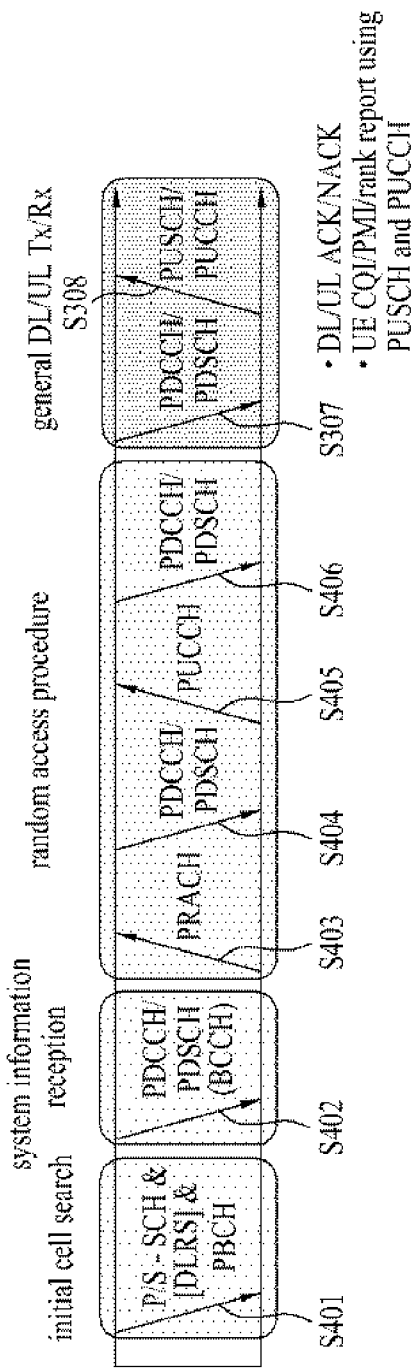
FIG. 4 illustrates physical channels and a general signal transmission method using the physical channels in a 3GPP system.

FIG. 4 illustrates physical channels and a general method for transmitting signals on the physical channels in the 3GPP system.

Referring to FIG. 4, when a UE is powered on or enters a new cell, the UE performs initial cell search (S401). The initial cell search involves acquisition of synchronization to an eNB. Specifically, the UE synchronizes its timing to the eNB and acquires a cell Identifier (ID) and other information by receiving a Primary Synchronization CHannel (P-SCH) and a Secondary Synchronization CHannel (S-SCH) from the eNB. Then the UE may acquire information broadcast in the cell by receiving a Physical Broadcast CHannel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control CHannel (PDCCH) and receiving a Physical Downlink Shared CHannel (PDSCH) based on information included in the PDCCH (S402).

If the UE initially accesses the eNB or has no radio resource for signal transmission, the UE may perform a random access procedure with the eNB (S403 to S406). In the random access procedure, the UE may transmit a predetermined sequence as a preamble on a Physical Random Access CHannel (PRACH) (S403 and S405) and receive a response message to the preamble on a PDCCH and a PDSCH associated with the PDCCH (S404 and S406). In case of a contention-based random access procedure, the UE may additionally perform a contention resolution procedure.

After the above procedure, the UE may receive a PDCCH and/or a PDSCH from the eNB (S407) and transmit a Physical Uplink Shared CHannel (PUSCH) and/or a Physical Uplink Control CHannel (PUCCH) to the eNB (S408), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 5:
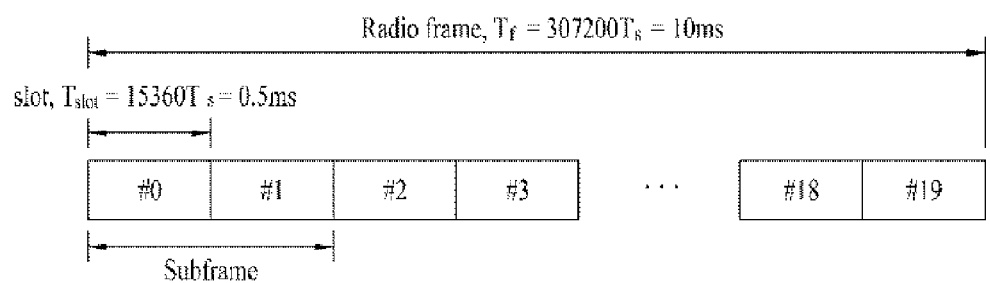
FIG. 5 illustrates the structure of a radio frame used in a Longer Term Evolution (LTE) system.

FIG. 5 illustrates the structure of a radio frame used in the LTE system.

Referring to FIG. 5, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and $Ts=1/(15\ kHz \times 2048)=3.2552 \times 10^{-8}$ (about 33 ns). A slot includes a plurality of OFDM symbols or SC-FDMA symbols in the time domain and a plurality of Resource Blocks (RBs) in the frequency domain. In the LTE system, one RB includes 12 subcarriers by 7 (or 6) OFDM symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM symbols in a slot may vary.

RRC states of a UE and how an RRC connection is established will be described below. The RRC states are defined depending on whether the RRC layer of a UE is logically connected to the RRC layer of the E-UTRAN. If an RRC connection has been established between the RRC layers of the UE and the E-UTRAN, the UE is in RRC_CONNECTED state. Otherwise, the UE is in RRC_IDLE state.

The E-UTRAN may effectively control UEs because it can determine the presence of RRC_CONNECTED UEs on a cell basis. However, the E-UTRAN cannot find out RRC_IDLE UEs on a cell basis and thus a CN manages RRC_IDLE UEs on a TA basis. A TA is an area unit larger than a cell. That is, if an RRC_IDLE UE wants to receive a service like voice or data service from a cell, it should transition to the RRC_CONNECTED state.

Especially, when a user initially powers on a UE, the UE first searches for a suitable cell and then stays in the RRC_IDLE state. Only when the RRC_IDLE UE needs to establish an RRC connection, the RRL IDLE UE transitions to the RRC_CONNECTED state by performing an RRC connection establishment procedure. In the case where the UE needs to transmit an uplink signal for a reason such as a call attempt from the user, or a response message to a paging message received from the E-UTRAN, the UE is to establish an RRC connection.

Figure 6:
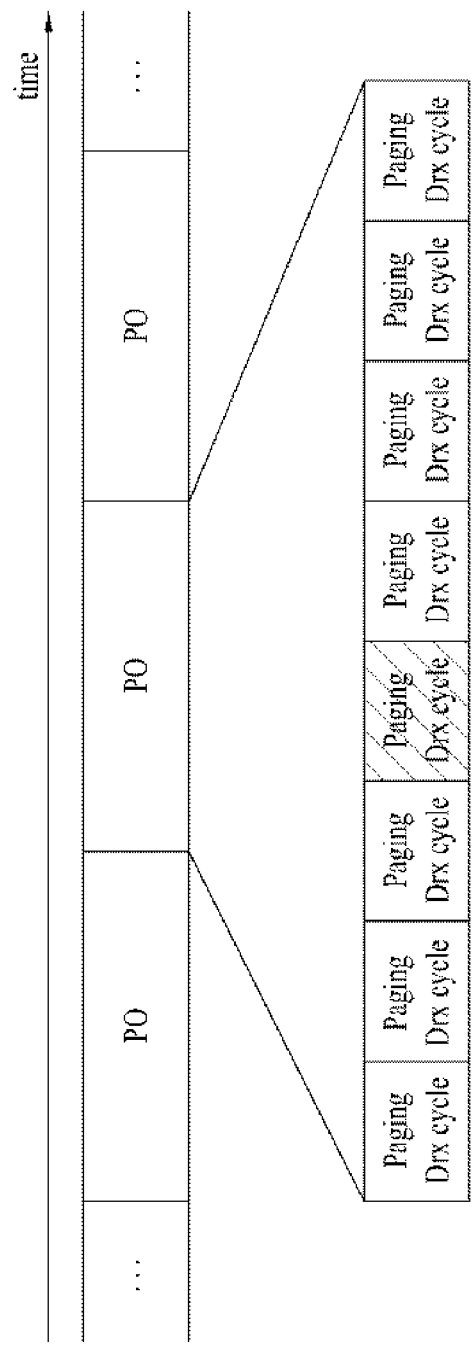
FIG. 6 illustrates a general transmission and reception method using a paging message.

FIG. 6 illustrates a general transmission and reception method using a paging message.

Referring to FIG. 6, a paging message includes a paging record having Paging Cause and UE Identity. In receiving a paging message, a UE may perform a Discontinuous Reception (DRX) operation in order to reduce power consumption. Specifically, the network configures a plurality of Paging Occasions (POs) in every time period called a paging DRX cycle. A specific UE may acquire a paging message by receiving only a predetermined PO. The UE may not receive a paging channel during a time period other than the predetermined PO and may be placed in sleep state during the time period in order to reduce power consumption. One PO corresponds to one TTI.

An eNB and a UE use a Paging Indicator (PI) as a specific value to indicate transmission of a paging message. The eNB may define a specific ID (e.g. a Paging-Radio Network Temporary Identity (R-RNTI)) as the PI and may indicate transmission of paging information to the UE by the specific ID. For example, the UE wakes up in every DRX cycle and receives a subframe to determine the presence of a paging message directed to it. In the presence of the P-RNTI on an L1/L2 control channel (a PDCCH) in the received subframe, the UE is aware that a paging message exists on a PDSCH in the subframe. If the paging message includes an ID of the UE (e.g. an International Mobile Subscriber Identity (IMSI)), the UE receives a service by responding to the eNB (e.g. establishing an RRC connection or receiving system information).

Now a description will be given of a measurement operation and measurement reporting.

In the following description, 'measurement' may refer to reception of reference signals from inter-frequency, intra-frequency, and inter-Radio Access Technology (RAT) cells and measuring the qualities of the cells at a UE, according to measurement configurations from a network. In addition, the term 'quality' means signal quality or cell quality determined from a reference signal received from a target measurement cell.

For support of UE mobility in the mobile communication system, the UE measures the qualities of a serving cell and neighbor cells continuously, at least in every DRX cycle. The UE reports the cell quality measurement results to the network at an appropriate time and the network provides optimum mobility to the UE through handover, etc.

To provide information helpful to network management of a service provider in addition to support of mobility, the UE may measure signals for a specific purpose set by the network and report cell quality measurement results to the network. For example, the UE receives broadcast information from a specific cell indicated by the network. The UE may report an ID (a global cell ID) of the specific cell, location information about the specific cell (e.g. a TA code), and/or other cell information (information indicating whether the specific cell is a Closed Subscriber Group (CSG) cell) to the serving cell.

If the UE determines that the quality of a specific area is very poor through measurement during movement, the UE may report location information about cells of poor quality and cell quality measurement results to the network. Thus the network may perform network optimization based on cell quality measurement result reports received from UEs, which are helpful to network management.

In a mobile communication system with a frequency reuse factor of 1, mobility occurs between difference cells in the same frequency band. Therefore, to ensure the mobility of a UE, the UE should be able to measure the qualities and cell information of neighbor cells in the same central frequency as its serving cell. Measurement of a cell having the same central frequency as a serving cell is called intra-frequency measurement. The UE performs intra-frequency measurement and reports cell quality measurement results to the network at an appropriate time, so that the purpose of cell quality measurement of an intended cell can be achieved.

A mobile service provider may manage a network using a plurality of frequency bands. In the case where a communication service is provided in a plurality of frequency bands, to ensure optimum mobility for a UE, the UE should be able to measure the qualities and cell information of neighbor cells having different central frequencies from that of a serving cell. Measurement of a cell having a different central frequency from that of a serving cell is called inter-frequency measurement. The UE should be able to perform inter-frequency measurement and report cell quality measurement results to the network at an appropriate time.

If the UE supports measurement of heterogeneous networks, the UE may measure cells in the heterogeneous networks according to eNB configurations. Measurement of heterogeneous networks is called inter-RAT measurement. For example, RATs may include UTRAN and GSM EDGE Radio Access Network (GERAN) conforming to the 3GPP standards and CDMA2000 conforming to the 3GPP2 standards.

A Minimization of Drive Test (MDT) scheme will be described below.

MDT is a process of measuring the quality of a cell using a vehicle by a service provider, for optimizing cell coverage. Compared to a conventional drive test method, MDT enables UEs within a cell to perform measurement and report the measurement results. Therefore, a cell coverage map may be created and time and cost taken for network optimization may be minimized.

There are two MDT schemes, logged MDT and immediate MDT. In logged MDT, a UE performs measurement for MDT, stores measurement data in an MDT log, and transmits the measurement data to the network at a specific time. On the other hand, in immediate MDT, the UE performs measurement for MDT and immediately reports measurement data to the network. The difference between logged MDT and immediate MDT lies in whether measurement results of a UE are reported to a network immediately or after being stored. Especially, an RRC_IDLE UE uses logged MDT because it cannot report a quality measurement result immediately due to the absence of an RRC connection.

Figure 7:
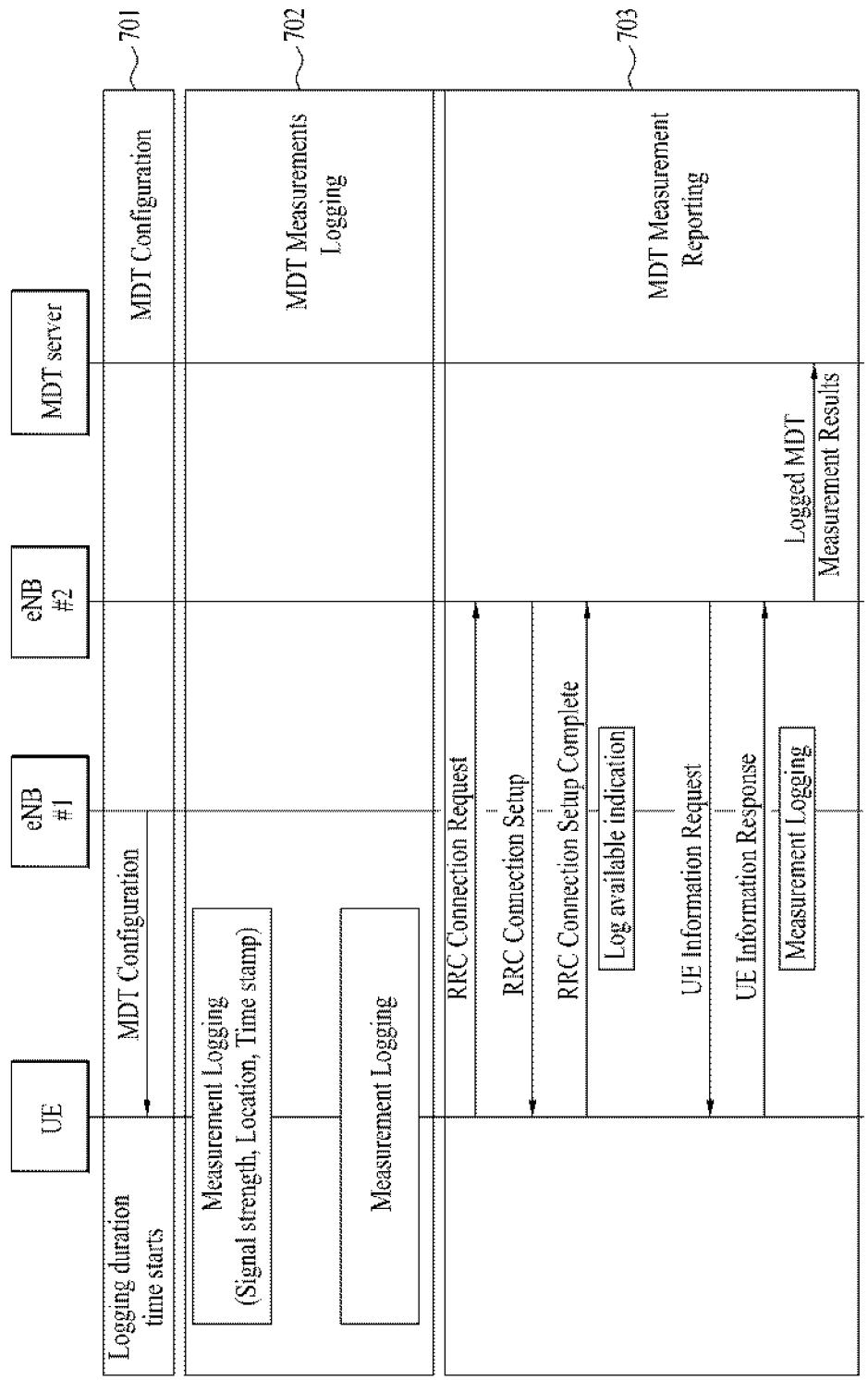
FIG. 7 is a diagram illustrating a signal flow for performing a logged Minimization of Drive Test (MDT) scheme.

FIG. 7 is a diagram illustrating a signal flow for performing the logged MDT scheme.

Referring to FIG. 7, to implement logged MDT, a UE may receive a message including logged MDT configurations from a cell (701).

The logged MDT configurations received at the UE may include a triggering configuration that triggers logging of an event, an MDT configuration valid duration, and an MDT area configuration.

The UE activates a timer set to the logged MDT configuration valid duration, as soon as it receives the logged MDT configurations (702). While the valid duration timer is running, the UE stores measurement results for logged MDT in RRC_IDLE state in an MDT log in every predetermined time period. The predetermined time period is a time period in which measurement results based on the logged MDT configurations are stored in the MDT log, which will be referred to as a logging period. In general, the logging period may be a multiple of a DRX cycle.

Upon expiration of the valid duration timer, the UE deletes the MDT configurations. However, the UE maintains the stored MDT cell quality measurement results for a predetermined time (e.g. 48 hours) to get an additional opportunity to report the MDT measurement results to the cell during the predetermined time.

For MDT, the UE measures mainly the quality of a camped-on cell, expressed as Reference Signal Received Power (RSRP) and Reference Signal Received Quality (RSRQ). If logged MDT is set for the UE, the UE measures and stores a cell quality in the RRC_IDLE state and reports the MDT measurement to the network later.

The service provider may create a coverage map representing service availability and a distribution of service qualities across an entire service area, taking into comprehensive account MDT measurements received from UEs, for use in network management and optimization. For example, when receiving a coverage issue report of a specific cell from UEs, the service provider may extend the coverage of the cell by increasing the transmission power of an eNB managing the coverage area.

While a cell quality measurement result for MDT is interchangeably used with a log, a UE log value, a measurement, a cell quality measurement result, etc., it will be referred to as an MDT measurement result herein.

Finally, an operation for reporting MDT measurement results in step 703 will be described.

If the UE has performed logged MDT and stored MDT measurement results, the UE notifies the network that it has MDT measurement results by an RRC connection setup complete message in an RRC connection establishment procedure.

Then the network transmits a command requesting transmission of the stored MDT measurement results to the UE and the UE replies to the network with the stored MDT measurement results.

When the UE performs an RRC connection reestablishment procedure, it may also notify the network that it has stored MDT measurement results by an RRC connection reestablishment complete message. During handover from a serving cell to a target cell, the UE may notify the target cell that it has stored MDT measurement results by a handover complete message.

A conventional MDT scheme focuses on measurement of parameters that do not much affect communication quality to which a user is sensitive. For example, a UE periodically measures the qualities of neighbor cells, stores the quality measurements in its memory, and transmits the stored quality measurements to the network, upon request of the network. That is, when data generated from an application installed in the UE is transmitted or received, no measurement is performed about whether the data has been reliably transmitted or how long the data has been delayed. Due to the absence of measurement data about communication quality directly related to users, the network cannot perform appropriate configurations for parameters that directly affect user satisfaction.

In this context, the present invention provides a method for performing measurement on communication quality directly perceivable to users and transmitting a measurement result to a network in an MDT scheme by a UE.

1) Specifically, the present invention proposes that a UE measures how much data has been lost in a protocol layer and transmits measurement data to the network. For instance, the UE checks the sequence number of each received PDCP Service Data Unit (SDU) or PDCP Protocol Data Unit (PDU) at the PDCP layer and counts the number of lost PDCH SDUs or PDCP PDUs. At the same time, the PDCP layer may count the number of successfully received PDCP SDUs or PDCP PDUs. The same operation may be performed at the MAC layer or the RLC layer.

Further, an appropriate criterion may be set to prevent transmission of too much unnecessary information from the UE to the network.

For example, the criterion for transmitting information from the UE to the network may be that the number of lost data units or the amount of lost data is equal to or larger than a threshold. In another example, the criterion may be that the ratio of the number of lost data to the total number of transmitted data is equal to or larger than a threshold. In a further example, the criterion may be that the ratio of the amount of data lost during transmission to the total amount of transmitted data is equal to or larger than a threshold.

If the UE satisfies the criterion for transmitting information to the network, the UE transmits measurement information and/or information about a generated event (e.g. an event of data loss) to the network by MDT. Especially, a valid duration timer, an MDT logging period, and an MDT measurement maintenance time (e.g. 48 hours) described in relation to the logged MDT scheme of FIG. 7 may be applied to the present invention.

Preferably, the UE performs measurement and makes a decision only for a predetermined time period in relation to whether the criterion for transmitting information to the network is satisfied.

2) The UE may measure how long it is taken for a protocol layer to transmit a data unit to the other party and transmit information about the measured time to the network.

That is, upon receipt of a data unit from a higher layer, the protocol layer records the reception time of the data unit, transmits the data unit to the other party, and records the successful arrival time of the data unit at the other party, thereby calculating the difference between the reception time and the successful transmission time. Or the protocol layer may measure a time period from a time when it initially attempts to transmit the data unit received from the higher layer to the other party to a time when the data unit successfully arrives at the other party. Or, upon receipt of the data unit from the higher layer, the protocol layer records the reception time of the data unit and records a starting transmission time of the data unit, thereby calculating the difference between the reception time and the starting transmission time.

During the above operation, the UE determines whether the network-set criterion for transmitting information to the network is satisfied. If the criterion is satisfied, the UE transmits measured information to the network by MDT.

The criterion may be that an average transmission time is equal to or larger than a threshold, that the ratio of data whose transmission time is equal to or larger than a first threshold is equal to or larger than a second threshold, or that a timer activated for a specific data unit has expired. Preferably, the timer is activated when the data unit is received from a higher layer.

Preferably, measurement may be performed on an RB basis during the operation. The network may preliminarily signal information about each threshold or the criterion to the UE. Instead of the UE, the network may perform measurement. In this case, measurement information may be transmitted to a CN including an MME.

More preferably, when the UE transmits measurement information to the network in 1) and 2), the UE transmits time and place information about the measurement along with the measurement information to the network.

3) Meanwhile, when a specific procedure is failed at the MAC layer, the UE performs a related measurement and transmits measurement information to the network according to the present invention. In this case, the measurement information is also transmitted by MDT. Especially, a valid duration timer, an MDT logging period, and an MDT measurement maintenance time (e.g. 48 hours) described in relation to the logged MDT scheme of FIG. 7 may be applied to the present invention.

For example, upon expiration of a reTX-BSR timer, the MAC layer of the UE measures and records the timer expiration. Additionally, the MAC layer records place information about the timer expiration. More specifically, the UE counts the number of expirations of the reTX-BSR timer for a predetermined time. If the number of expirations of the reTX-BSR timer is equal to or larger than a threshold, the UE records the number of expirations of the reTX-BSR timer. In the presence of related place information, the UE also stores the place information. The predetermined time for which the UE counts the number of expirations of the reTX-BSR timer may be an MDT logging period.

The reTX-BSR timer is a timer used at the MAC layer. The reTX-BSR timer is activated after the UE transmits a Buffer Status Report (BSR) message to the network. If the network allocates no radio resources to the UE until expiration of the reTX-BSR timer, the UE retransmits the BSR message and restarts the reTX-BSR timer. Later, the UE transmits the recorded information to the network by MDT.

In addition, the UE may measure the number of HARQ retransmissions of each data unit. If the number of HARQ retransmissions satisfies a predetermined criterion, the UE may report the number of HARQ retransmissions to the network. For example, in every predetermined time interval or each time a new MAC PDU is transmitted, the UE records the number of HARQ retransmissions needed for transmitting the MAC PDU, and time and place information about the transmissions. Then, the UE calculates the average of HARQ retransmission numbers. If the average number of HARQ retransmissions satisfies a predetermined criterion, that is, the number of HARQ retransmissions is equal to or larger than a threshold, the UE reports the number of HARQ retransmissions to the network. Or, after recording the average number of HARQ retransmissions, if the average number of HARQ retransmissions is changed to or above a predetermined value, the UE may report the changed average number of HARQ retransmissions to the network. Preferably, the UE may perform such measurement only on a MAC PDU including data of a specific channel.

Additionally, to monitor generation of data in an area, the UE may record time and place information about triggering of buffer status information transmission or information about a time when a buffer of the UE is flushed (i.e. a time when data is all transmitted), in every predetermined time or each time a specific event occurs. The specific event may be that data is filled to or above a predetermined level set by the network in a buffer or that the amount of data buffered in the buffer for a predetermined time is equal to or larger than a threshold.

In an example, the UE monitors activities of the MAC layer. Each time transmission of a BSR message is triggered, the UE records the place, cause, and time of triggering the BSR transmission and transmits the recorded information to the network, upon request of the network or if a predetermined criterion is satisfied. In addition, the network may indicate a specific channel to the UE and only whenever a BSR is triggered in relation to the specific channel, the UE may record information.

Meanwhile, when transmission of a BSR message is triggered, the UE transmits a Scheduling Request (SR) message using PUCCH resources or performs a random access procedure. In another method for implementing the present invention, when the SR message is triggered or the random access procedure starts, the UE records the SR message triggering or the starting of the random access procedure and transmits the information to the network later. Additionally, the UE may record information about a place where each operation has started.

Similarly, the RLC layer may record the number of retransmissions of each RLC SDU or RLC PDU and transmit an average retransmission number to the network. Or if the number of data units having a retransmission number equal to or larger than a first threshold is equal to or larger than a second threshold, the RLC layer may record related information and transmit the recorded information to the network.

In the foregoing embodiments of the present invention, the network needs to indicate information to be measured to the UE in advance. The network also needs to signal information about a threshold or a criterion to the UE in advance, together with or separately from the information to be measured. The information may be included in pre-configuration information, for example, MDT configuration information.

Information transmitted by the UE may be used for the network to provide Multimedia Multicast Broadcast Service (MBMS) and other similar services in the present invention.

Since the UE performs and reports measurements regarding communication quality directly perceivable to users, the management cost of the network (capital expenditure (Capex) and operational expenditure (Opex)) can be reduced.

Figure 8:
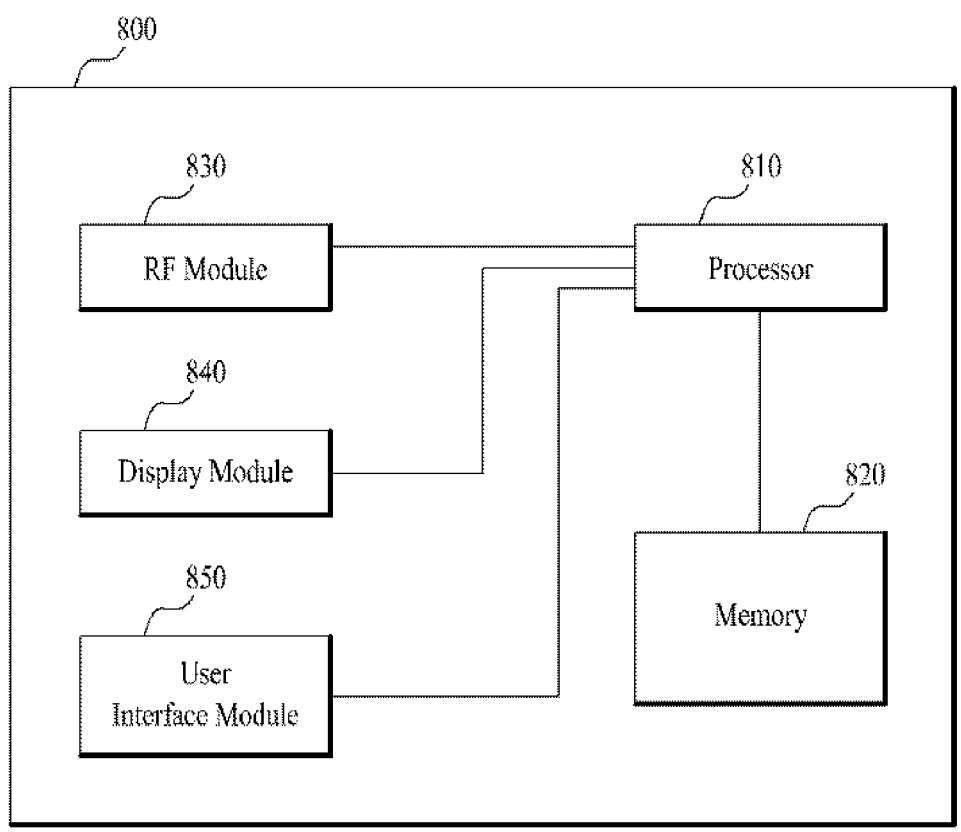
FIG. 8 is a block diagram of a communication transceiver according to an embodiment of the present invention.

FIG. 8 is a block diagram of a communication transceiver according to an embodiment of the present invention. The communication transceiver may be a part of an eNB or a UE.

Referring to FIG. 8, a communication transceiver 800 includes a processor 810, a memory 820, a Radio Frequency (RF) module 830, a display module 840, and a user interface module 850.

For the convenience's sake of description, the communication transceiver 800 is shown as including the components illustrated in FIG. 8. Thus, some modules may be omitted from or added to the communication transceiver 800, when needed. In addition, a module in the communication transceiver 800 may be configured into separate modules. The processor 810 is configured to perform operations according to the embodiments of the present invention described before with reference to the drawings.

Specifically, when the transceiver 800 is a part of an eNB, the processor 810 may generate a control signal and map the control signal to a control channel configured in a plurality of frequency blocks. If the transceiver 800 is a part of a UE, the processor 810 detects a control channel directed to the UE from a signal received in a plurality of frequency blocks and extracts a control signal from the control channel.

Then the processor 810 may perform a necessary operation based on the control signal. For detailed operations of the processor 810, refer to the descriptions of FIGS. 1 to 7.

The memory 820 is connected to the processor 810 and stores an Operating System (OS), applications, program code, and data. The RF module 830 is connected to the processor 810 and functions to convert a baseband signal to an RF signal or an RF signal to a baseband signal. For this purpose, the RF module 830 performs analog conversion, amplification, filtering, and frequency upconversion, or performs these operations reversely. The display module 840 is connected to the processor 810 and displays various types of information. The display module 840 may be configured with, but not limited to, known components such as a Liquid Crystal Display (LCD), a Light Emitting Diode LED), and an Organic Light Emitting Diode (OLED). The user interface module 850 is connected to the processor 810 and may be configured using known user interfaces such as a keypad, a touch screen, etc. in combination.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, eNode B (eNB), access point, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for reporting measurement information to a network at a UE in a wireless communication system have been described in the context of a 3GPP LTE system, they are also applicable to other various wireless communication systems.

The invention claimed is:

1. A method for transmitting and receiving a signal to and from a network at a User Equipment (UE) in a wireless communication system, the method comprising:
   receiving measurement configuration information from the network;
   storing data unit retransmission information based on the measurement configuration information, if a predetermined condition is satisfied;
   receiving a request message requesting a measurement result from the network; and
   transmitting the data unit retransmission information to the network in response to the request message,
   wherein the predetermined condition is that scheduling information is not received from the network until expiration of a predetermined timer after transmitting a buffer status report message, and
   wherein the data unit retransmission information includes a number of expirations of the predetermined timer during a storing period of the data unit retransmission information.

2. The method according to claim 1, wherein the measurement configuration information includes at least one of: the storing period of the data unit retransmission information, a valid duration of the measurement configuration information, and a maintenance time of the stored data unit retransmission information.

3. The method according to claim 1, wherein the data unit retransmission information further includes at least one of location information and time information about triggering of the buffer status report message.

4. The method according to claim 1, wherein storing the data unit retransmission information comprises storing the data unit retransmission information when the number of expirations of the predetermined timer is equal to or larger than a threshold.

5. The method according to claim 4, wherein information about the threshold is included in the measurement configuration information.

6. The method according to claim 1, wherein storing the data unit retransmission information comprises storing the data unit retransmission information when the number of data units for which the number of expirations of the predetermined timer is equal to or larger than a first threshold, which is equal to or larger than a second threshold.

7. The method according to claim 6, wherein information about the first and second thresholds is included in the measurement configuration information.

8. The method according to claim 1, wherein the data unit is related to a specific channel and information about the specific channel is received from the network.

9. A User Equipment (UE) in a wireless communication system, the UE comprising:
   a radio frequency (RF) module configured to receive and transmit signals with a network; and
   a processor configured to:
      process the signals;
      store data unit retransmission information based on measurement configuration information received from the network, if a predetermined condition is satisfied;
      control the RF module to receive a request message requesting a measurement result from the network; and
      transmit the data unit retransmission information to the network in response to the request message,
      wherein the predetermined condition is that scheduling information is not received from the network until expiration of a predetermined timer after a buffer status report message is transmitted, and
      wherein the data unit retransmission information includes a number of expirations of the predetermined timer during a storing period of the data unit retransmission information.

10. The UE according to claim 9, wherein the measurement configuration information includes at least one of: the storing period of the data unit retransmission information, a valid duration of the measurement configuration information, and a maintenance time of the stored data unit retransmission information.

11. The UE according to claim 9, wherein the data unit retransmission information further includes at least one of location information and time information about triggering of the buffer status report message.

12. The UE according to claim 9, wherein the processor is configured to store the data unit retransmission information when the number of expirations of the predetermined timer is equal to or larger than a threshold.

13. The UE according to claim 12, wherein information about the threshold is included in the measurement configuration information.

14. The UE according to claim 9, the processor is configured to store the data unit retransmission information when the number of data units for which the number of expirations of the predetermined timer is equal to or larger than a first threshold, which is equal to or larger than a second threshold.

15. The UE according to claim 14, wherein information about the first and second thresholds is included in the measurement configuration information.

16. The UE according to claim 9, wherein the data unit is related to a specific channel and information about the specific channel is received from the network.

* * * * *